United States Patent
Sarto

[15] 3,662,722
[45] May 16, 1972

[54] COOL EXHAUST RECYCLING
[72] Inventor: Jorma O. Sarto, Orchard Lake, Mich.
[73] Assignee: Chrysler Corporation, Highland Park, Mich.
[22] Filed: Apr. 22, 1970
[21] Appl. No.: 30,722

[52] U.S. Cl. ...................................................123/119 A
[51] Int. Cl. ..................................................F02m 25/06
[58] Field of Search ......................................123/119 A

[56] References Cited

UNITED STATES PATENTS

| | | | |
|---|---|---|---|
| 2,154,417 | 4/1939 | Anderson | 123/119 A |
| 2,317,582 | 4/1943 | Bicknell | 123/119 A |
| 3,204,621 | 9/1965 | Holiday | 123/119 A |
| 3,237,615 | 3/1966 | Daigh | 123/119 A |

Primary Examiner—Wendell E. Burns
Attorney—Talburtt and Baldwin

[57] ABSTRACT

An automobile engine recycles a fraction of its exhaust gases by means of a restricted bypass conduit connecting its fuel-air inlet conduit at the diffuser region of the customary fuel inducing venturi restriction with a source of comparatively cool exhaust gases comprising a dead-end sound attenuating chamber of the exhaust muffler. The chamber is in communication with the exhaust gases in the muffler but is out of the direct exhaust flow path, such that lead contaminants in the exhaust gases cool and solidify as minute particles that readily flow through the restricted bypass duct. The recycling exhaust gas flow is modulated by the pressure differential between the chamber and venturi restriction. A supplemental control valve responsive to the position of the engine throttle valve may be employed in the bypass conduit to close or restrict the latter when the throttle valve is at either its idle or wide open position.

19 Claims, 2 Drawing Figures

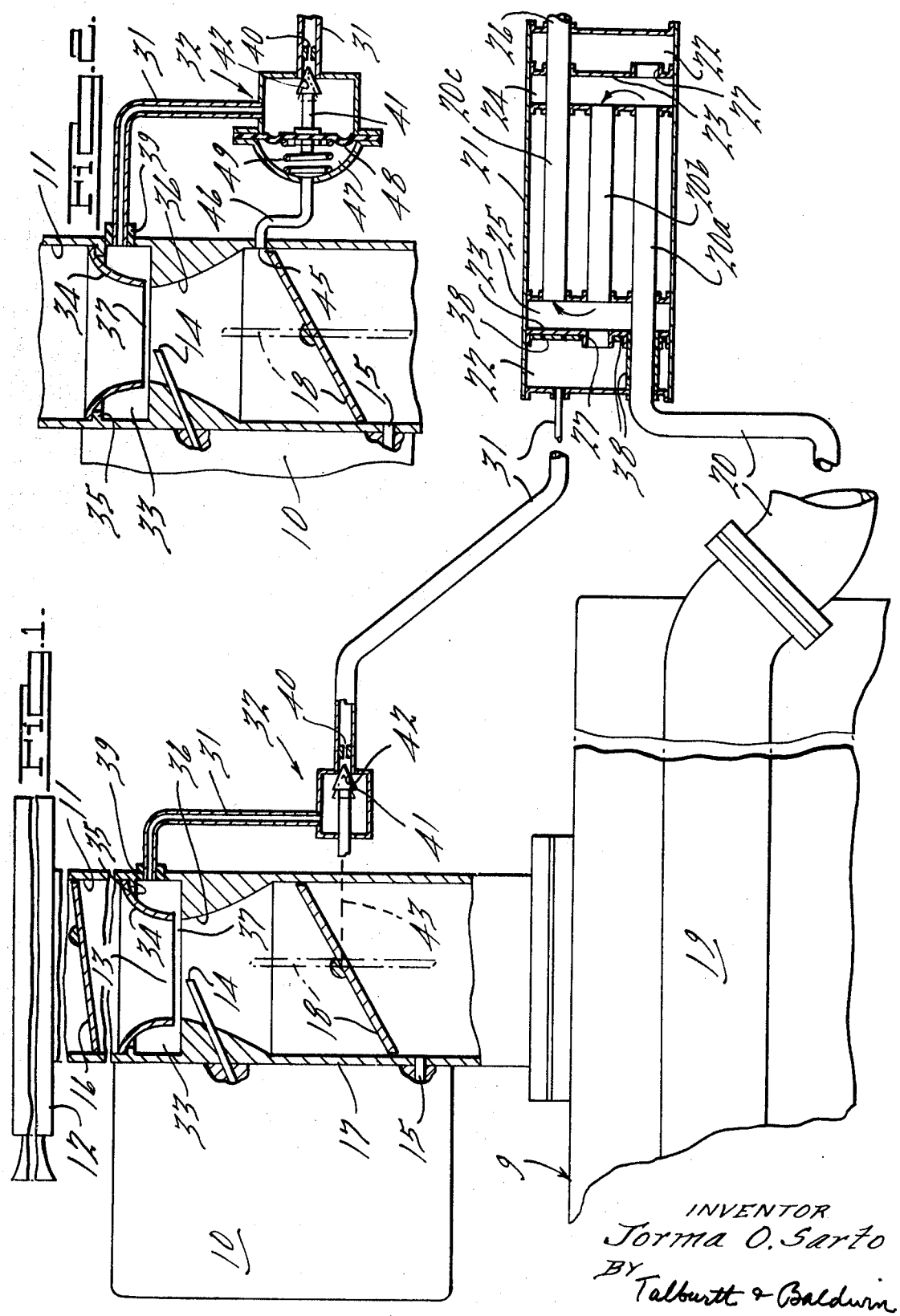
INVENTOR
Jorma O. Sarto
BY Talburtt & Baldwin
ATTORNEYS.

COOL EXHAUST RECYCLING

BACKGROUND AND SUMMARY OF THE INVENTION

In the prior art, numerous systems have been devised to recycle exhaust gas into the fuel-air induction system of an automobile engine for the purposes of pre-heating and vaporizing the incoming air-fuel mixture to facilitate its complete combustion in the combustion zone, for re-using the unignited or partially burned portions of the fuel which would otherwise pass out the exhaust pipe and into the atmosphere, and for reducing the oxides of nitrogen emitted from the exhaust system into the atmosphere. It has been found that approximately 15 percent exhaust gas recycling is required at moderate engine loads to substantially reduce the nitrogen oxide content of the exhaust gases discharged in the atmosphere, that is, to below about 1,000 parts per million.

Although the prior art structures have had the desired effect of reducing nitrogen oxides in the exhaust by reducing the maximum combustion temperature in consequence of diluting the fuel-air mixture with recycled exhaust gases during certain operating conditions of the engine, these structures have not been commercially acceptable from the standpoints of both cost and operating efficiency and have been complicated by the accumulation of gummy deposits comprised largely of lead oxides which clog the restricted bypass conduit provided for recycling the exhaust, and have also been complicated by the desirability of reducing the recycling during conditions of both engine idling when nitrogen oxide emission is a minor problem and wide open throttle when maximum power is required, while progressively increasing the recycling of exhaust gases with increasing engine load at part open throttle. The nitrogen oxide emission is a direct function of combustion temperature and for that reason is less critical during engine idling when the rate of fuel combustion and the consequent combustion temperature are minimal, and during wide open throttle conditions which are ordinarily of short duration.

In the usual gasoline or hydrocarbon fuel type engine, fuel combustion can take place at about 1,200° F. The formation of nitrogen oxides does not become particularly objectionable until the combustion temperature exceeds about 2,200° F., but the usual engine combustion temperature which increases with engine load or the rate of acceleration at any given speed frequently rises to about 2,500° F. It is known that the recycling of at least one-twentieth and not more than one-fourth of the total exhaust gases through the engine, depending on the load or power demand, will reduce the combustion temperature to less than 2,200° F. Lead contaminants in the exhaust resulting from fuel additives desired for improved combustion characteristics normally exist in a gaseous state at combustion temperatures exceeding about 1,700° F, but tend to condense and leave a gummy residue that is particularly objectionable at the location of metering orifices and valve seats in the exhaust recycling or bypass conduit when the temperature of the recycling exhaust gases falls much below 1,700° F. It has been found that by cooling the exhaust gases to be recycled to between approximately 700° F and 550° F, the major portions of the lead bearing contaminants in the exhaust solidify as tiny particles susceptible of being readily carried in the stream of cooled recycling gases and through metering orifices or valve ports without collecting thereat.

An important object of this invention is to provide improved means comprising a minimum of moving parts for recirculating a portion of the combustion products from the exhaust system to the inlet system of an automobile engine, which is particularly adapted for use with lead containing fuel and which overcomes or avoids the problems and deficiencies of the prior art and achieves a number of important results including preheating and improved mixing and carburetion of the fuel-air mixture in the inlet header, the reduction of ice formation on the customary throttle blade, and the reduction of noxious nitrogen oxides in the exhaust.

Another object is to provide such a construction wherein a portion of the exhaust gases are collected at a downstream location of the exhaust system in a sound attenuating chamber of the exhaust muffler. Appreciable cooling of the hot exhaust gases normally results as these gases are conducted from the engine combustion chamber via the conventional uninsulated exhaust pipe to the muffler. At the muffler, a fraction of the exhaust gases are withdrawn from the primary exhaust flow and conducted into the aforesaid sound attenuating chamber, which is substantially a dead-end chamber that serves to damp sound waves in the primary exhaust gas flow and which has sidewalls exposed to the atmosphere for dissipating heat, whereby the comparatively quiescent gases within the chamber are cooled additionally to below the temperature at which a significant portion of the lead contaminants solidify. A portion of the cooled exhaust gases are then conducted from the sound attenuating or cooling chamber via a restricted bypass duct to the air inlet system for the engine, and are thence recycled through the combustion chamber to effect a controlled combustion temperature sufficiently low to effectively reduce the formation of noxious oxides of nitrogen, yet sufficiently high to obtain efficient engine operation.

Although the recycled exhaust gases are cooled sufficiently to solidify a major portion of the lead contaminants, these gases are still hot relative to the atmosphere and are preferably not less than about 200° F to 250° F at their introduction into the engine air inlet system, so as to be useful in preheating the inlet air. Accordingly the recycled gases may be recycled into the inlet air system at a location above the customary engine throttle valve to facilitate mixing and vaporization of liquid fuel droplets and to reduce ice formation at the throttle.

By virtue of the construction described, the pressure of the exhaust gases in the sound attenuating chamber will always be greater than atmospheric and will increase with increasing engine load. Thus the pressure differential between the upstream end of the bypass conduit for the recycling exhaust gas (at the sound attenuating chamber) and the downstream end of the bypass conduit (at the inlet air system) will be a function of engine load or fuel consumption and the recycling exhaust gas flow through the bypass conduit will be a corresponding function.

Another object of the invention is to introduce the recycling exhaust gas into the inlet air system at the diffuser region of the customary venturi restriction employed to induce fuel into the inlet air stream as a function of the venturi static pressure. The latter varies inversely with the throttle opening, which controls the inlet air flow. Accordingly the recycling exhaust flow through the bypass conduit will be an inverse function of the venturi pressure which enhances the pressure differential signal between the upstream and downstream ends of the bypass conduit and thereby effectively controls the bypass flow of the cooled exhaust gases. At idle operation of the engine when exhaust recycling is not desired, the pressure reduction at the venturi and the pressure increase at the muffler are both nominal and the recycling exhaust flow will likewise be nominal, as desired.

Other objects are to provide such a construction comprising a bypass conduit having a fixed metering restriction for predetermining the recycling of cool exhaust gases in accordance with the aforesaid pressure differential, so as to dilute the inlet fuel-air mixture by more than 5 percent but less than 25 percent and usually by about 15 percent of the total exhaust gases to reduce the formation of nitrogen oxide during the combustion process when the engine is operating at part open throttle acceleration, and to provide a construction wherein a control valve responsive to the position of the engine throttle valve closes the bypass conduit when the throttle valve is at either the idle or near wide open position and opens the bypass conduit throughout the major range of part throttle operation.

After a period of acceleration when the engine speed has attained the cruising condition, the combustion temperature and the pressure differential across the fixed metering restriction, as well as the total quantity of exhaust gases, decrease and the rate of exhaust recycling declines for improved fuel economy, again as described because less recycling is required to maintain the combustion temperature below the level at which nitrogen oxide formation is objectionable.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a schematic fragmentary sectional view of an automobile engine embodying the present invention, the air inlet conduit, exhaust muffler, and exhaust recycling system being shown in longitudinal section.

FIG. 2 is a view similar to FIG. 1, showing a modification.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENTS

Referring to FIG. 1, an application of the present invention is illustrated by way of example with an automobile engine 9 having a carburetor 10 providing the inlet fuel-air induction conduit 11, which comprises the upstream portion of an inlet header for supplying a combustible fuel and air mixture to the engine. The carburetor 10 may comprise any conventional type which receives fresh air from the usual air filter 12 at the upstream end of the induction conduit 11 and comprises the usual main fuel metering system including the venturi restriction 13 and nozzles or jets 14 and 15 for supplying operating and idle fuel to the conduit 11 during various operating conditions and for enriching the fuel supply during acceleration and wide open throttle, and the usual automatic choke (including unbalanced choke valve 16) and thermostatic means (not shown) for controlling idle enrichment and fast idle operation during cold starting conditions. An example of such a carburetor is illustrated by way of example in Ball U.S. Pat. No. 2,966,344, so that the foregoing conventional features disclosed in the latter patent are incorporated herein by reference and are not described in detail.

The downstream portion of the induction conduit 11 comprises the customary throttle body 17 containing the conventional butterfly type throttle valve 18. The inlet fuel-air mixture is conducted via the inlet 11 to the engine cylinders for combustion therein, and the exhaust gases are conducted to the exhaust manifolds or headers 19, which discharge through an exhaust conduit 20 and muffler 21 to the atmosphere.

The muffler 21 is partitioned into one or more sound attenuating chambers 22 by internal baffles 23 and provides exhaust flow passages 20a, 20b and 20c connected by rear and front turn-around passages 24 and 25 to comprise a continuation of the exhaust conduit 20, connecting the same with the conventional tailpipe 26. The chambers 22 are substantially dead-end and are in communication by means of tuning ducts 27 with the hot exhaust gases in the muffler 21 but are out of the direct exhaust flow path, so that the exhaust gases within the chambers 22 are comparatively quiescent and rapidly lose heat to the atmosphere through the adjacent outer walls of the muffler 21.

A restricted bypass duct 31 has its upstream end in communication with the forward chamber 22 at a location preferably out of alignment with the associated duct 27 to receive the cooled exhaust gases for recycling the same through the engine 9 via a control valve 32. From the valve 32, the bypass duct 31 extends through the sidewall of the induction conduit 11 and into an annular distribution chamber 33 defined by an annular shell 34 comprising the upper portion of the carburetor venturi restriction 13. In the present instance the shell 34 seats on a locating projection 35 cast integrally with the body of the carburetor 10 and is spaced from a lower venturi portion 36 also cast integrally with the body of the carburetor 10. The space between the shell 34 and venturi portion 36 comprises a narrow annular slit 37 at the diffuser portion of the venturi restriction 13, whereby exhaust gases introduced into chamber 33 are distributed substantially uniformly around the axis of the inlet conduit 11 to effect optimum mixing of the exhaust gases and inlet air and to facilitate vaporization and mixing of liquid fuel droplets supplied via nozzle 14.

In order to facilitate cooling of the gases within the front chamber 22, the latter may be thermally insulating at 38 from the adjacent portions of the baffles 23 and conduit 20a. Similarly, in order to prevent heating of the carburetor body by the recycling exhaust gases, the downstream end of the bypass duct 31 may be insulated at 39 from the sidewall of conduit 11.

In accordance with the structure shown, the hot exhaust gases flowing from the header 19 to the muffler 21 are cooled appreciably during their passage along the exhaust passage 20. Thereafter a portion of these exhaust gases entering the front chamber 22 are additionally cooled as aforesaid within the latter chamber to temperatures between approximately 550° to 700° F. In one application of the present invention on an automobile operated at 90 miles per hour with ambient air temperatures of 90° F, the temperature in front chamber 22 was 550°. By the time the exhaust gases conducted via duct 31 reached the induction conduit 11, their temperature was reduced to about 250°F. Accordingly, the recycled exhaust gases entering the induction conduit 11 via slit 37, although appreciably cooled with respect to the combustion temperature, were still sufficiently warm to facilitate vaporization and mixing of the inlet fuel.

As the throttle 18 opens with increasing engine load from the idle position shown, the exhaust pressure within muffler 21 will increase correspondingly to increase the flow of bypass gases through duct 31, which flow will be determined by the dimensions of restriction 40 in duct 31. Thus, without further considerations, the muffler exhaust pressure will modulate the bypass exhaust flow through duct 31 into conduit 11 as a function of engine load. In addition the pressure differential across restriction 40 is amplified as a function of engine load by a drop in the static pressure of the inlet gases at the venturi restriction 13. The restriction 40 is predetermined with respect to the operating pressures in the front chamber 22 and at the venturi 13, so that the resulting bypass exhaust flow will amount to at least 5 percent and more than 25 percent of the total exhaust gas flow, depending upon the specific engine and its operating conditions. In the usual situation, effective reduction of nitrogen oxides in the combustion process is accomplished by recycling approximately 15 percent of the total exhaust gases; preferably through several slits arranged in the manner of the slit 37 where a multiple barrel carburetor is involved.

In order to block recycling of the exhaust gases at wide open throttle when the exhaust pressure is at a maximum and the venturi pressure is a minimum, a control valve plunger 41 within the valve housing 32 is operably coupled with the throttle 18 to seat against an annular valve seat 42, defining a portion of conduit 31, to close the conduit 31. Any suitable coupling, as for example an operable mechanical linkage 43 indicated generally by the dotted connection between the valve 18 and plunger 41, may be employed to move plunger 41 against the valve seat 42 and close the conduit 31 when the throttle valve 18 moves to either its idle position shown or to the wide open position indicated in phantom. By virtue of the location of the restriction 40 adjacent and upstream of the plunger 41 and seat 42, the restriction 40 is readily accessible for adjustment or modification.

FIG. 2 illustrates a modified control for the valve plunger 41 responsive to positions of the throttle 14. In FIG. 2, a port 45 opens into the conduit 11 adjacent the upper edge of the throttle valve 18 so as to be in the high pressure region of the conduit 11 when the valve 18 is at the idle position shown in solid lines. Upon opening of the throttle valve 18, the pressure at port 45 gradually decreases throughout a range of part open throttle positions and then gradually increases as the throttle valve 18 nears the wide open position illustrated in phantom.

The port 45 is connected by conduit 46 with a pressure chamber 47 having one wall defined by a flexible diaphragm 48. The diaphragm 48 is connected with plunger 41 and is normally urged rightward by spring 49 against the seat 42 to close the bypass duct 31. During both conditions of idle or wide open throttle, spring 49 maintains plunger 41 at the seated position, but during part throttle operating conditions, the low pressure at port 45 is transmitted to diaphragm 48 to move plunger 41 leftward from the seat 42 and open the duct 31 for recycling the comparatively cool exhaust gases from the chamber 22.

I claim:
1. In an internal combustion engine,
   A. an inlet conduit for conducting a fuel-air mixture into said engine for combustion therein,
   B. an exhaust conduit for discharging hot exhaust gases from said engine,
   C. an exhaust muffler having
      1. a flow path in communication with said exhaust conduit to receive said exhaust gases and conduct the same through said muffler, and
      2. means for providing a source of comparatively cool exhaust gases with respect to the temperature of the exhaust gases in said flow path comprising baffle means defining a sound attenuating chamber off said flow path and in communication therewith, and
   D. means for effectively inhibiting the formation of noxious oxides of nitrogen during said combustion by limiting the temperature thereof comprising restricted bypass duct means having
      1. one end opening into said chamber to receive said cool exhaust gases, and
      2. a second end opening into said inlet conduit to discharge said cool exhaust gases thereinto.

2. In the combination according to claim 1, said chamber having an exterior surface in heat exchange relationship with the atmosphere.

3. In the combination according to claim 2, said chamber being dimensioned and said opening of said one end of said bypass duct means into said chamber being located with respect to the location of the communication between said chamber and flow path to maintain the cool exhaust gases flowing from said chamber at temperatures between approximately 500° F and 700° F.

4. In the combination according to claim 1, said second end of said bypass duct means extending through the sidewall of said inlet conduit, and means for insulating the exhaust gas flowing in said bypass duct means from the heat of said inlet conduit.

5. In the combination according to claim 1, said inlet conduit having a venturi restriction therein, and said second end of said bypass duct means opening into said inlet conduit at the region of said venturi restriction to modulate the flow of said cool exhaust gases in said bypass duct means as a function of the gas flow through said venturi restriction.

6. In the combination according to claim 5, said second end of said bypass duct means extending through the sidewall of said inlet conduit at the region of said venturi restriction, and means for insulating the exhaust gas flowing through said bypass duct means from the heat of said inlet conduit.

7. In the combination according to claim 5, throttle valve means in said inlet conduit movable between idle and wide open positions, and control valve means in said bypass duct means for controlling the flow of said cool exhaust gases therein and responsive to the position of said throttle valve means for restricting the latter flow when said throttle valve means is at said idle and wide open positions.

8. In the combination according to claim 7, said control valve means including a control valve element movable to vary the restriction of said bypass duct means, a pressure actuated diaphragm operably coupled with said control valve element, and a pressure sensing duct operably connecting said inlet conduit and diaphragm to actuate said control valve element in accordance with the pressure in said inlet conduit.

9. In the combination according to claim 8, the restriction in said bypass duct means comprising a control orifice having a predetermined dimension and being located upstream of said control valve element.

10. In the combination according to claim 8, said throttle valve means comprising a throttle blade pivotal within said inlet conduit at a location downstream of said venturi restriction and having a leading edge movable in an upstream direction upon opening movement of said throttle blade from its idle position, resilient means yieldingly urging said control valve element to restrict said bypass duct means, the coupling between said diaphragm and control valve element comprising means for urging the latter in opposition to said resilient means to open said bypass duct means upon the application of low pressure to one side of said diaphragm, said pressure sensing duct having one end opening into said inlet conduit at a location adjacent said leading edge and within a high pressure region of said inlet conduit when said throttle blade is at its idle position, said leading edge being movable upstream of the latter location to reduce the pressure thereat throughout a limited range of opening movement of said throttle blade from said idle position, a second end of said pressure sensing duct being in communication with said one side of said diaphragm to apply thereto the pressure at said one end of said pressure sensing duct.

11. In the combination according to claim 10, the restriction in said bypass duct means comprising a control orifice having a predetermined dimension and being located upstream of said control valve element.

12. In the method of operating an internal combustion engine utilizing leaded fuel, the steps of
   1. providing a comparatively dead-end chamber in communication with and out of the direct path of the hot exhaust flow from said engine,
   2. cooling the exhaust gases within said chamber sufficiently to solidify a major proportion of lead contaminants therein, and
   3. recycling a portion of the cooled exhaust gases from said chamber by metering the later gases through a metering restriction into the air inlet for said engine to reduce the formation of nitrogen oxides.

13. In the method according to claim 12, restricting the recycling flow of said cooled gases when said engine is operating at either idle or wide open throttle conditions.

14. In the method according to claim 12, wherein said inlet includes a venturi restriction, the additional step of modulating the recycling flow of said cooled gases in accordance with the flow of inlet gases within said inlet by introducing the cooled gases into said inlet at the region of said venturi restriction.

15. In the method according to claim 14, restricting the recycling flow of said cooled gases when said engine is operating at either idle or wide open throttle conditions.

16. In the method of claim 12, said step of cooling the exhaust gases comprising cooling said gases to less than 700° F.

17. In the method of claim 12, the step of cooling said exhaust gases comprising cooling said gases within said chamber to between 550° F. and 700° F.

18. In the method of claim 17, the step of recycling a portion of the cooled exhaust gases into said inlet comprising conducting the last named portion via a fixed metering restriction into said inlet at temperatures between 200° F. and 700° F.

19. In the method of claim 17, wherein said inlet includes a venturi restriction, the step of recycling a portion of the cooled exhaust gases into said inlet comprising conducting the last named portion via said metering restriction into said inlet at the region of said venturi restriction at temperatures between 200° F. and 700° F.

* * * * *